(12) United States Patent
Dubhashi et al.

(10) Patent No.: US 8,539,233 B2
(45) Date of Patent: Sep. 17, 2013

(54) BINDING CONTENT LICENSES TO PORTABLE STORAGE DEVICES

(75) Inventors: Kedarnath A. Dubhashi, Redmond, WA (US); James M. Alkove, Woodinville, WA (US); Patrik Schnell, Issaquah, WA (US); Alexandre V. Grigorovitch, Redmond, WA (US); Vikram Mangalore, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 11/753,403

(22) Filed: May 24, 2007

(65) Prior Publication Data

US 2008/0294894 A1 Nov. 27, 2008

(51) Int. Cl.
*H04L 9/32* (2006.01)

(52) U.S. Cl.
USPC ............... 713/168; 726/30; 726/14; 713/155; 713/185; 705/59

(58) Field of Classification Search
USPC .................. 726/4, 9, 20, 2; 713/155–159
See application file for complete search history.

(56) References Cited

U.S. PATENT DOCUMENTS

| | | | |
|---|---|---|---|
| 5,715,403 A * | 2/1998 | Stefik | 705/44 |
| 6,681,017 B1 * | 1/2004 | Matias et al. | 380/277 |
| 6,999,947 B2 | 2/2006 | Utsumi et al. | |
| 7,010,808 B1 | 3/2006 | Leung et al. | |
| 7,076,067 B2 | 7/2006 | Raike et al. | |
| 7,103,574 B1 | 9/2006 | Peinado et al. | |
| 7,142,674 B2 * | 11/2006 | Brickell | 380/44 |
| 7,461,249 B1 * | 12/2008 | Pearson et al. | 713/156 |
| 7,689,250 B2 * | 3/2010 | Kravitz et al. | 455/557 |
| 7,711,959 B2 * | 5/2010 | Schmidt et al. | 713/181 |
| 7,779,479 B2 * | 8/2010 | Lee et al. | 726/27 |
| 7,801,819 B2 * | 9/2010 | Swenson et al. | 705/52 |
| 7,809,957 B2 * | 10/2010 | Grawrock | 713/193 |
| 7,917,946 B2 * | 3/2011 | Lindholm et al. | 726/14 |
| 7,975,312 B2 * | 7/2011 | Broderson et al. | 726/30 |
| 8,079,071 B2 * | 12/2011 | Jogand-Coulomb et al. | 726/10 |

(Continued)

FOREIGN PATENT DOCUMENTS

| | | |
|---|---|---|
| JP | WO2006129934 | 12/2006 |
| JP | 2007104465 | 4/2007 |

(Continued)

OTHER PUBLICATIONS

Alapam Arnab, Specifications for a Componetised DRM framework, Sep. 4, 2005, Univ. Cape Town, pp. 41-43, 50-53.*

(Continued)

*Primary Examiner* — Nathan Flynn
*Assistant Examiner* — Viral Lakhia
(74) *Attorney, Agent, or Firm* — Lee & Hayes, PLLC

(57) ABSTRACT

Systems, methods, and/or techniques ("tools") for binding content licenses to portable storage devices are described. In connection with binding the content licenses to the portable storage devices ("stores"), a host may perform authentication protocols that include generating a nonce, sending the nonce to a store, and receiving a session key from the store, with the session key being generated using the nonce. The store may perform authentication protocols that include receiving the nonce from the host, generating a random session key based on the nonce, and sending the session key to the host.

20 Claims, 12 Drawing Sheets

(56) References Cited

U.S. PATENT DOCUMENTS

| | | | |
|---|---|---|---|
| 8,261,319 B2* | 9/2012 | Libin et al. | 726/2 |
| 8,296,240 B2* | 10/2012 | Read | 705/59 |
| 2003/0007646 A1 | 1/2003 | Hurst et al. | |
| 2003/0194092 A1* | 10/2003 | Parks et al. | 380/281 |
| 2003/0212892 A1* | 11/2003 | Oishi | 713/168 |
| 2003/0233550 A1* | 12/2003 | Brickell | 713/171 |
| 2004/0064694 A1* | 4/2004 | Lee et al. | 713/168 |
| 2005/0004875 A1 | 1/2005 | Kontio et al. | |
| 2005/0182727 A1 | 8/2005 | Robert et al. | |
| 2005/0182931 A1 | 8/2005 | Robert et al. | |
| 2005/0210252 A1 | 9/2005 | Freeman et al. | |
| 2005/0216763 A1* | 9/2005 | Lee et al. | 713/200 |
| 2005/0234826 A1 | 10/2005 | Ohmori et al. | |
| 2005/0257074 A1* | 11/2005 | Alkove et al. | 713/193 |
| 2005/0277403 A1* | 12/2005 | Schmidt et al. | 455/410 |
| 2005/0289343 A1* | 12/2005 | Tahan | 713/169 |
| 2006/0026433 A1 | 2/2006 | Montenegro | |
| 2006/0031175 A1* | 2/2006 | Sellars et al. | 705/67 |
| 2006/0047976 A1 | 3/2006 | Moroney et al. | |
| 2006/0136735 A1* | 6/2006 | Plotkin et al. | 713/182 |
| 2006/0154648 A1* | 7/2006 | Oh et al. | 455/411 |
| 2007/0028118 A1* | 2/2007 | Brown et al. | 713/185 |
| 2007/0081666 A1 | 4/2007 | Shima | |
| 2007/0100701 A1* | 5/2007 | Boccon-Gibod et al. | 705/21 |
| 2007/0100893 A1* | 5/2007 | Sanders | 707/200 |
| 2007/0178938 A1* | 8/2007 | Kravitz et al. | 455/558 |
| 2007/0220616 A1* | 9/2007 | Oh | 726/30 |
| 2007/0226489 A1* | 9/2007 | Hug et al. | 713/156 |
| 2008/0027868 A1* | 1/2008 | Ljung et al. | 705/51 |
| 2008/0040618 A1* | 2/2008 | Andersson et al. | 713/193 |
| 2008/0046758 A1* | 2/2008 | Cha et al. | 713/189 |
| 2008/0059797 A1* | 3/2008 | Tokuno et al. | 713/171 |
| 2008/0072061 A1* | 3/2008 | Cannon et al. | 713/185 |
| 2008/0109656 A1* | 5/2008 | Kotzin | 713/165 |
| 2008/0114958 A1* | 5/2008 | Jogand-Coulomb et al. | 711/164 |
| 2008/0235140 A1* | 9/2008 | Read | 705/59 |
| 2009/0064341 A1* | 3/2009 | Hartung et al. | 726/27 |
| 2009/0151006 A1 | 6/2009 | Saeki et al. | |

FOREIGN PATENT DOCUMENTS

| | | |
|---|---|---|
| JP | 2007128278 | 5/2007 |
| JP | 200765985 | 11/2007 |
| JP | 200719688 | 8/2008 |
| WO | WO2006126801 A1 | 11/2006 |

OTHER PUBLICATIONS

Atallah, et al., "Enhanced Smart-card based License Management", retrieved at <<http://ieeexplore.ieee.org/iel5/8596/27235/01210240.pdf?isNumber=>>, Proceedings of the IEEE International Conference on E-Commerce (CEC'03), IEEE, 2003, 9 pages.

Aura, et al., "Software License Management With Smart Cards", retrieved at <<http://www.usenix.org/events/smartcard99/full_papers/aura/aura_html/#sec:smart_cards>>, Proceedings of USENIX Workshop on Smartcard Technology, May 10-11, 1999, Chicago, pp. 1-10.

Mana, et al., "EC-GATE: An Infrastructure for DRM", retrieved at <<http://www.lcc.uma.es/~yague/SemanticsBasedAccessControl/CNIS_DRM'03.pdf>>, Proceedings of the IASTED International Conference Communication, Network, and Information Security, Dec. 10-12, 2003, USA, University of Malaga, Spain, pp. 6.

Zhang, et al., "FLMP: A Flexible License Management Protocol for Digital Rights Management", retrieved on Oct. 5, 2006, at <<http://scholar.google.com/scholar?num=20&hl=en&lr=lang_en&q=cache:Id1Q-c3IfoUJ:viola.usc.edu/paper/SPIE_VCIP2005/DATA/5960_122.PDF+DRM+license+store+bind>>, Tsinghua University, China, pp. 1-12.

The Chinese Office Action mailed Dec. 14, 2011 for Chinese patent application No. 200880016965.2, a counterpart foreign application of US patent application No. 318484.01, 8 pages.

The Chinese Office Action mailed May 24, 2012 for Chinese patent application No. 200880016965.2, a counterpart foreign application of U.S. Appl. No. 11/753,403, 6 pages.

Chinese Office Action mailed Nov. 26, 2012 for Chinese patent application No. 200880016965.2, a counterpart foreign application of U.S. Appl. No. 11/753,403, 5 pages.

Japanese Office Action mailed Feb. 13, 2013, for Japanese patent application No. 2010-509542, a counterpart foreign application of U.S. Appl. No. 11/753,403, 11 pages.

Tsukada, "Public Key Infrastructure for the Enterprise System", Nikkei BP, published on Dec. 25, 2001, pp. 1-10, 20-28, and 43-45.

* cited by examiner

BINDING CONTENT LICENSES TO PORTABLE STORAGE DEVICES

BACKGROUND

Various types of content are becoming increasingly available on removable storage units. These storage units may readily be inserted into different devices to enable the devices to access the content contained in the storage.

In some instances, this content may be subject to licenses, which are administered by digital rights management (DRM) systems. In such instances, the content may be bound or licensed to a given instance of storage, but the content may be accessed from a variety of different devices. In these environments, managing compliance with licensing policies or restrictions may present challenges for the DRM systems.

SUMMARY

Systems, methods, and/or techniques ("tools") for binding content licenses to portable storage devices are described. In connection with binding the content licenses to the portable storage devices ("stores"), devices for interacting with or performing actions on content ("hosts") may perform authentication protocols that include generating a nonce, sending the nonce to a store, and receiving a session key from the store, with the session key being generated using the nonce. The store may perform authentication protocols that include receiving the nonce from the host, generating a random session key based on the nonce, and sending the session key to the host.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to binding content licenses to portable storage devices are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide for binding content licenses to portable storage devices. This discussion also describes other techniques and/or processes that the tools may perform.

Figure 1:
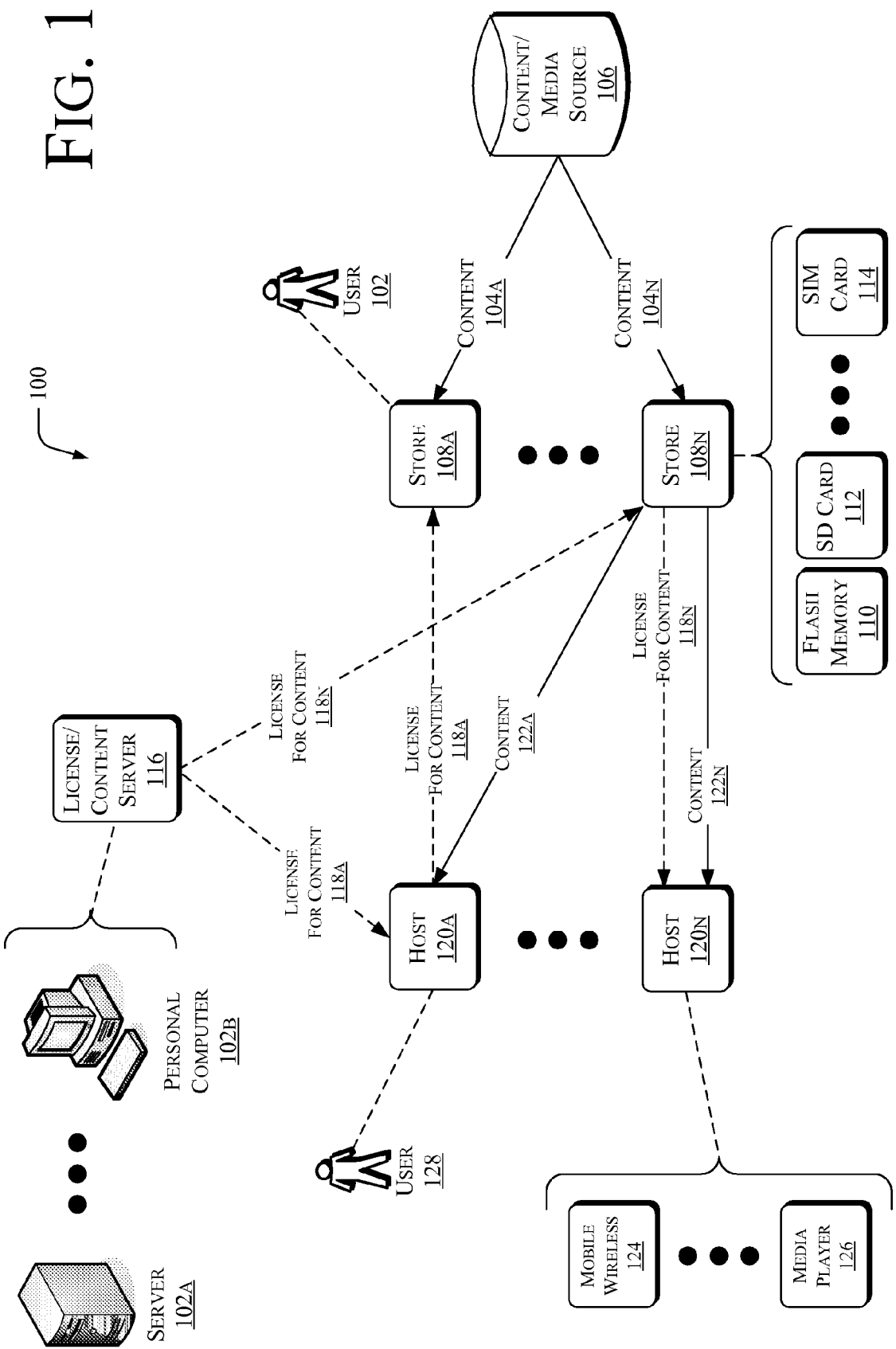
FIG. 1 is a block diagram illustrating operating environments for binding content licenses to portable storage devices, with related data flows.

FIG. 1 illustrates operating environments 100 for binding content licenses to portable storage devices. The operating environments 100 may enable one or more users 102 to obtain content, and store it in one or more storage devices for later viewing and access. FIG. 1 generally denotes content at 104, and depicts two instances of content at 104a and 104n for convenience, but not limitation. FIG. 1 also shows one user 102, who may obtain content 104a from a content or media source 106, and may load the content into a storage device 108. FIG. 1 shows two storage devices 108 at 108a and 108n, once again for example only, and not for limitation. FIG. 1 shows content 104a being stored in storage device 108a (shortened to "store" herein for convenience), and content 104n being stored in storage device 108n.

In general, the operating environments 100 may enable any number of users 102 to obtain any number of instances of content 104 from any number of content sources 106. Additionally, the operating environments may include any number of stores 108. FIG. 1 provides the scenario as shown only for ease of description, but not limitation.

The content 104 may include audio components, such as songs, music, recorded readings of books or magazines, or the like. The content 104 may also include audio and/or video components, such as movies, video clips, or the like. In some instances, but not necessarily all, video components may combine with corresponding audio components to provide multimedia content. The content 104 may also include still images, games, ringtones, silent video, text, or any other form of digitized information, either alone or in combination with audio and/or video components.

The content source 106 may represent services that are accessible over a wide area communication network, such as the Internet, to enable users 102 to download the content 104. Without limiting possible implementations with the following examples, the content source 106 may enable the users to download the content free of charge (e.g., in exchange for receiving ads), or may enable the users to download the content for a fee. In addition, the users may subscribe to receive the content.

Turning to the storage devices or stores 108, examples of such these devices may include, but are not limited to portable memory devices, such as flash memories 110, Secure Digital (SD) cards 112, Subscriber Identity Modules (SIM) cards 114, hard drives, dongles that communicate via Universal Serial Bus (USB) busses, or the like.

The operating environments 100 may also include one or more license servers or services, denoted generally at 116. In general, the license servers enable the users 102 to obtain any licenses appropriate for playing or otherwise interacting with or performing actions on the content 104. The licenses may permit interacting with or performing actions on the content under certain conditions, or may specify policies or limitations applicable to interacting with or performing actions on the content. Examples of such policies or limitations may include, but are not limited to, counts, time restrictions, or the like.

In some cases, the license servers 116 may provide not only licenses for content, but also the content itself. Thus, FIG. 1 labels the server 116 as a license/content server. In these instances, one entity may perform the functions of both the license server 116 and the content source 106. In other instances, the user 102 may download the content from one entity functioning as the content source 106, and may interact with a separate license server to secure an appropriate license to play the content.

Once the user 102, or any entity acting on behalf of the user, obtains licenses appropriate for playing the content, the operating environments may bind the licenses to the stores 108. The term "binding" as used herein with licenses refers to cryptographically associating a particular content license related to a particular device (e.g., the stores 108), such that the device is permitted to interact with or performing actions on the content under the terms of that license. As shown in FIG. 1, a license for the content 104*a* as cryptographically bound to the device 108*a* is represented generally by the arrow 118*a*, while a license for the content 104*n* as cryptographically bound to the device 108*n* is represented generally by the arrow 118*n*.

The operating environments 100 may include one or more host devices 120 ("hosts") for playing, viewing, or otherwise interacting with or performing actions on the content 104. FIG. 1 shows two hosts 120*a* and 120*n* for illustration purposes only, but not for limitation. FIG. 1 provides an example in which content 122*a* and 122*n* has been loaded onto the storage device 108*n*, and accessed via two different hosts 120*a* and 120*n*.

Turning to the hosts 120 in more detail, the hosts may include devices such as mobile wireless devices 124, which may represent mobile telephones, smart phones, wireless personal digital assistants (PDAs), or the like. The hosts 120 may also include portable media players 126. Any of the devices 124 or 126 may be suitable for playing audio, video, or other content 122.

As described above, the license(s) for particular content is cryptographically bound to the respective storage devices 108, as represented by the arrows 118. Binding the licenses to stores is contrasted from binding the licenses to particular hosts 102. Because the licenses for the content are cryptographically bound to the stores 108, the licenses "travel" with the stores 108. These licenses enable any host that communicates with the store, to which the license is cryptographically bound, to play the content, provided that the host has a valid host certificate and provides a conformant implementation of host functionality.

FIG. 1 illustrates several scenarios for the licenses 118. In some scenarios, the licenses may flow first to a host, and then to a store. FIG. 1 provides an example of this scenario, as represented by the dashed line 118*a* flowing from block 116, to block 120*a*, and then to block 108*a*. In other scenarios, the licenses may flow first to a store, and then to a host. FIG. 1 provides an example of this scenario, as represented by the dashed line 118*n* flowing from block 116, to block 108*n*, and then to block 120*n*.

As an example of this licensing scenario, FIG. 1 shows a license 118*n* for the content 104*n* that is cryptographically bound to the store 108*n*, as represented by the dashed line 118*n*. A user 128, who may or may not be the same as the user 102, may play the content 104*n* under the terms of this license 118*n* by, for example, inserting the store 108*n* into the host 120*a*, and issuing appropriate commands to the host 120*a*. FIG. 1 generally represents playing the content 104*n* in the host 120*a* at 122*a*. However, if the user 128 afterwards removes the store 108*n* from the host 120*a*, and inserts the store 108*n* into another host 120*n*, the license for the content 104*n* moves with the store 108*n* to the other host 120*n*. The first host 120*a* retains no residual rights to play the content 104*n*. The user 128 may then play the content 104*n* on the other host 120*n* by issuing appropriate commands to this other host. This scenario may be repeated any number of times for an arbitrary number of hosts 120.

Figure 2:
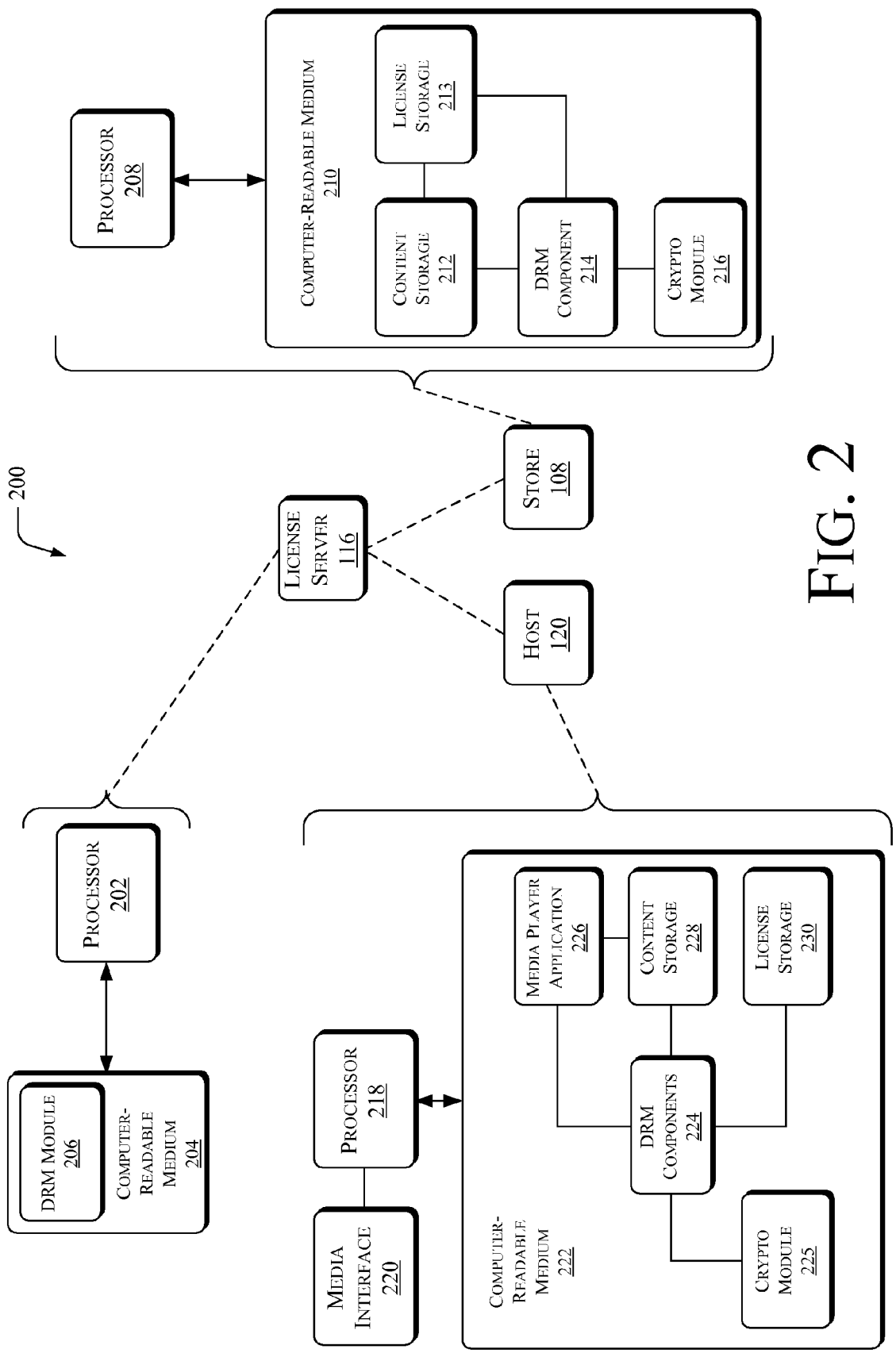
FIG. 2 is a block diagram illustrating additional aspects of a license server, a store, and a host, which are shown in FIG. 1.

Having described the operating environments 100 as shown in FIG. 1, the discussion now turns to a description of more detail regarding the license server 116, the store 108, and the host 120, now presented with FIG. 2

FIG. 2 illustrates additional aspects 200 of the license server 116, the store 108, and the host 120 as shown in FIG. 1. For convenience of description, but not to limit possible implementations, some items described previously are carried forward into FIG. 2 and denoted by similar reference signs.

Turning first to the license server 116, it may be a computer-based system that includes one or more processors, denoted at 202. These processors may also be categorized or characterized as having a given type or architecture, but may or may not have the same type or architecture.

The license server 116 may also include one or more instances of machine-readable or computer-readable storage media, denoted generally at 204. The computer-readable media 204 may contain instructions that, when executed by the processor 202, perform any of the tools or related functions that are described herein as being performed by the license server. The processor may access and/or execute the instructions embedded or encoded onto the computer-readable media, and/or may access data stored in the computer-readable media.

Turning in more detail to the computer-readable media 204, it may include one or more instances of a digital rights management (DRM) module 206. The DRM module 206 may include, for example, one or more software modules, which when loaded into the processor and executed, cause the license server to administer licenses applicable to digital content (e.g., content 104 in FIG. 1).

In different implementations, the license server may enable direct or indirect license acquisition (respectively, DLA and ILA) scenarios. The term direct licensing scenario refers to when a device obtains a license directly from a license server. The term indirect licensing scenario refers to when a device obtains a license indirectly from a license server by communicating through one or more intermediate devices, such as a personal computer or other proxy.

Additionally, the DRM module may interpret and enforce any rights and restrictions on licenses granted to users (e.g., 102 in FIG. 1). These limitations may specify how many times the users may play particular content, may specify any time restrictions applicable to playing the content, or the like.

In general, the DRM module may establish policies applicable to interacting with or performing actions on particular instances of the content.

Turning now to the storage device or store 108, it may include a processor 208, which may or may not be the same type or architecture as the processor 202. The store 108 may also include a computer-readable medium 210 that is in communication with the processor 208. The computer-readable media 210 may contain instructions that, when executed by the processor 208, perform any of the tools or related functions that are described herein as being performed by the store 108. The processor 208 may access and execute the instructions embedded or encoded onto the computer-readable media 210, and may access data stored in the computer-readable media 210.

The computer-readable media 210 may include storage areas for any content loaded onto the store (e.g., content 104 in FIG. 1). FIG. 2 denotes these content storage areas generally at 212. The content storage areas 212 may include areas for storing any number of discrete instances of the content, depending on how much content the store contains.

The computer-readable media 210 may also include storage areas for licenses associated with content loaded into the store. FIG. 2 denotes these license storage areas at 213. The license storage areas 213 may include areas for storing any number of discrete instances of the content licenses, depending on how much content the store contains, and how much of this content is subject to license.

The computer-readable media 210 may include a DRM component 214, which may include one or more software modules that cooperate and/or communicate with the DRM module 206, which is provided by the license server 116. The DRM component 214 and/or the DRM module 206 may administer any licenses applicable to the content stored in the content storage 212. More specifically, the DRM component may store any information appropriate for tracking compliance with licenses applicable to the content. For example, the DRM component may track how many times the content has been accessed, when the content was accessed, or the like.

Referring briefly back to the content/license storage areas 212, in some implementations, those portions of the content/license storage areas that store the licenses may be secure and/or hidden, to hinder (and possibly prevent) unauthorized access to any information related to administering the licenses.

The computer-readable media 210 may include a cryptographic module, denoted in FIG. 2 as crypto module 216. The crypto module 216 may include a separate hardware module with which the processor 208 communicates. However, for ease of illustration, the crypto module 216 is shown as a software module residing in the computer-readable media 210. The crypto module may include one or more software modules that may be loaded into the processor 208 and executed to enable the store to establish, maintain, and tear down secure sessions with the host 120. Further details relating to these secure sessions are provided below. Additionally, the crypto module 216 may maintain any public/private keys assigned to the store as part of these secure sessions, or as part of any other cryptographic operations. The crypto module 216 may also include implementations of cryptographic algorithms for performing the cryptographic operations.

Turning now to the host 120, it may include a processor 218, which may or may not be the same type and architecture as the processors 202 and 208. The processor 218 may communicate or cooperate with a media interface 220, which may include, for example, a slot and connector into which the storage device 108 may be inserted by a user.

The host 120 may also include a computer readable medium 222, which, in turn, may contain a DRM component 224. In some instances, the DRM component 224 may communicate or cooperate with the DRM module 206 on the license server 116, or with DRM components 214 on one or more of the stores 108. In other instances, the DRM component 224 may communicate or cooperate with both the DRM module 206 and the DRM component 214.

The computer readable medium 222 may include a crypto module 225, which may perform cryptographic operations on behalf of the host. The crypto module 225 may, for example, cooperate indirectly with the crypto module 216 on the store. Aside from the differences in operating context, the above description of the crypto module 216 may apply equally to the crypto module 225. For example, the crypto module 225 may be implemented as a separate hardware module with which the processor 218 may communicate.

The host 120 may receive indications that the store 108 has been inserted in the media interface 220. These indications may include electrical signals, software and/or hardware interrupts, software reporting events, or the like. In response to such indications, the DRM component 224 may search the store 108 for any content that is subject to license, may identify any licenses applicable to the content, and may bind the licenses to the store. Additionally, the DRM component may enable the host 120 to enforce of any policies applicable to the playing of the content, e.g., playcounts, time restrictions, or the like.

In some cases, the host 120 may access the store 108 directly, for example, when a user inserts the store into a slot provided by the host. In other instances, the host may access the store indirectly through another device. For example, the host 120 as shown in FIG. 2 may include a wireless link to another host into which the user inserts the store.

The computer readable medium 222 may include a media player application 226. In different possible implementations, the media player application include one or more software modules for playing the content (e.g., content 122) to the user 128, or otherwise enabling the user 128 to access the content. For example, the media player application may include a movie or video viewing application, an audio playing application, or the like, depending on the nature and type of the content included in a particular implementation.

While not shown in FIG. 2 for clarity of illustration, the computer readable medium 222 may include one or more content decoder modules for decoding different types of content that may be played or accessed on the hosts. The computer readable medium 222 may also include one or more transmission modules that facilitate communications between the hosts and the servers 116.

The computer readable medium 222 may include a content storage area 228 into which the DRM component 224 loads content for access by the media player application 226. For example, the content storage area 228 may include a buffer or other suitable data structure for storing the content for the media player application.

The computer readable medium 222 may also include a license storage area 230 into which the DRM component loads license information. For example, assuming that the DRM component loads a given instance of content from the store into the content storage area 228, and assuming that the content is subject to licensing polices, the DRM component may load any information relating to enforcing or administering these policies into the license storage area 230.

As detailed further below, the DRM component 224 may enforce any licensing polices applicable to any content loaded into the content storage area 228. When a user (e.g., user 128 in FIG. 1) inserts the store 108 into the media interface 220, the user may browse any content contained in the store, and may select content for playing or access. The DRM component may then determine whether the selected content is subject to licensing polices, and may further determine what those licensing policies are. The DRM component may also load information representing these polices into the license storage area 230, and may load the selected content into the content storage area 228. Assuming compliance with any applicable licensing restrictions or polices, the DRM component may authorize the media player application to perform the requested action on the selected content to the user 220. In any instances of non-compliance, the DRM component may present an appropriate error message to the user, advising of the non-compliance, and possibly suggesting how to achieve compliance by obtaining an appropriate license.

To perform the foregoing functions, the DRM component 224 may, in some instances, communicate with the DRM component 214 on the store. In other instances, the DRM component 224 may communicate with the DRM module 206 on the license server 116. In some cases, the DRM component 224 may communicate with both the DRM module 206 and the DRM component 214.

Figure 3:
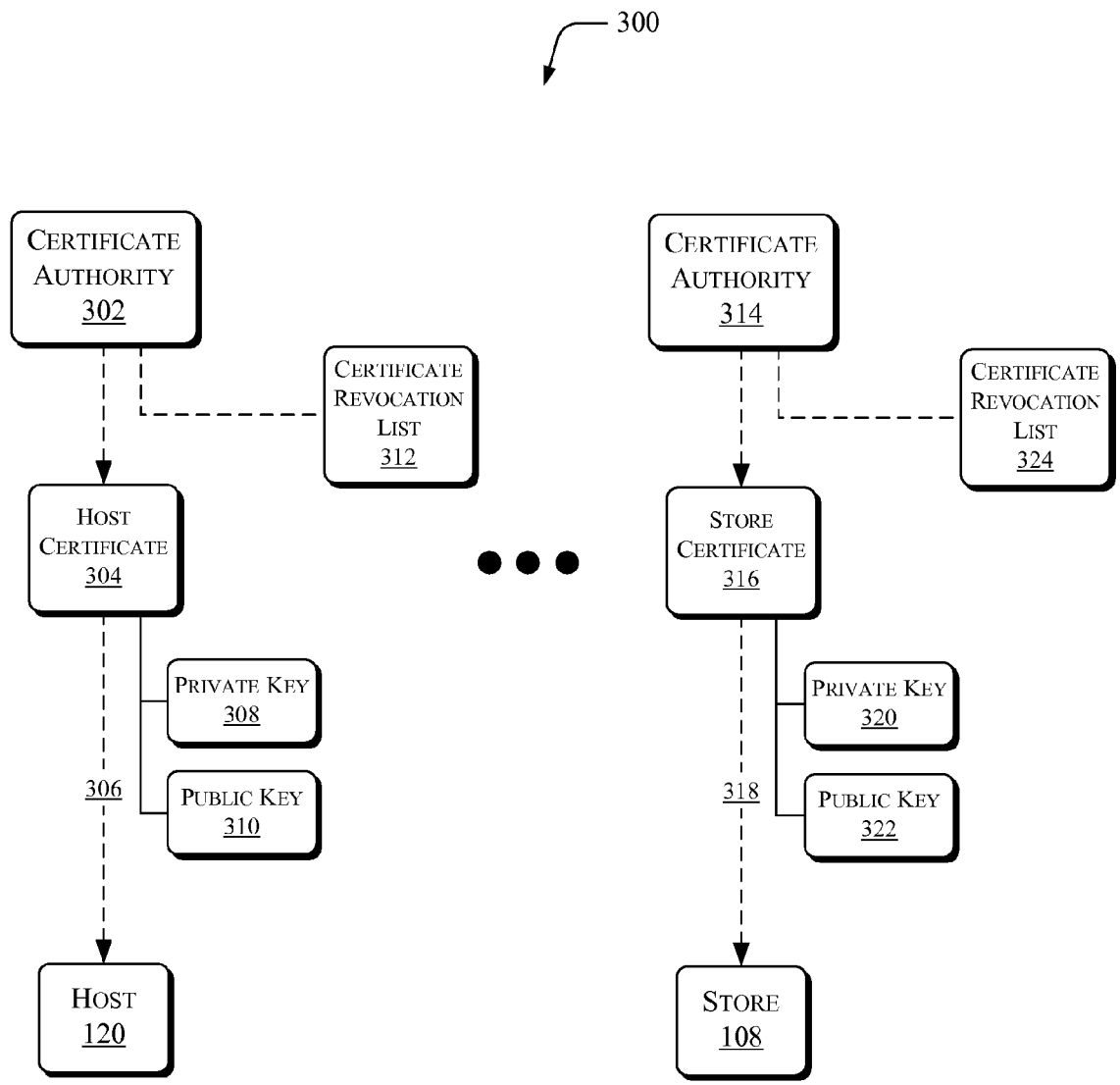
FIG. 3 is a block diagram illustrating infrastructures for issuing certificates and public/private keys to the host and to the store.

Having described the additional aspects of the license server 116, the store 108, and the host 120 in FIG. 2, the discussion now turns to a description of certificates and public/private keys as issued to the host and to the store, now presented with FIG. 3.

FIG. 3 illustrates infrastructures 300 for issuing certificates and public and private keys to a host (e.g., host 120), and to a store (e.g., store 108). For convenience of description, but not to limit possible implementations, some items described previously are carried forward into FIG. 3 and denoted by similar reference signs.

FIG. 3 illustrates a certificate authority 302 that issues a certificate 304 to a host, as represented by the dashed line 306. While FIG. 3 shows one certificate authority 302 for ease of illustration, the certificate authority 302 may be within a tree or other larger group of certificate authorities. Along similar lines, the certificate 304 could be a single certificate issued by the certificate authority 302, or could represent a collection of certificates corresponding to a path within the certificate authority tree.

In some instances, the host certificate 304 may include at least a host private key 308 and a host public key 310. In other instances, the host certificate may include at least the host public key 310, with the host private key being delivered separately. The host may have access to the host private key corresponding to the host public key. Additionally, the certificate authority 302 may also maintain a certificate revocation list 312 that lists current status of any certificates previously issued by the certificate authority 302 or any certificate authority in a tree of certificate authorities. More specifically, the certificate revocation list 312 may indicate whether one or more given certificates have been revoked or have otherwise become invalid.

FIG. 3 also illustrates a certificate authority 314 that may issue a certificate 316 to the store 108, as represented by the dashed line 318. In some instances, the store certificate 316 may include at least a store private key 320 and a store public key 322. In other instances, the host certificate may include at least the store public key 322, with the store private key being delivered separately. The store may have access to the store private key corresponding to the store public key. Additionally, the certificate authority 314 may also maintain a certificate revocation list 324 that lists any certificates previously issued by the certificate authority 314 or any certificate authority in a tree of certificate authorities. More specifically, the certificate revocation list 324 may indicate whether one or more given certificates that have been revoked or have otherwise become invalid.

Any licenses applicable to content contained on the store 108 may be cryptographically bound to or associated with the private key or a collection of private keys 320 issued to the store 108. In this manner, the certificate infrastructure 300 shown in FIG. 3 may bind the license to the store 108, rather than the host 120. More specifically, the license is cryptographically bound to the private key 320 by the user of the public key 322. Recall that the arrows 118 shown in FIG. 1 represent this license binding.

FIG. 3 shows separate certificate authorities 302 and 314 only for ease of illustration and description, but not to limit possible implementations of the description herein. It is noted that a single certificate authority may issue certificates both to given stores 108 and to given hosts 120. In addition, the DRM module 206 provided by a license server (e.g., 116 in FIG. 1) may perform as a certificate authority, and may issue certificates to the host 120 and/or the store 108.

Figure 4:
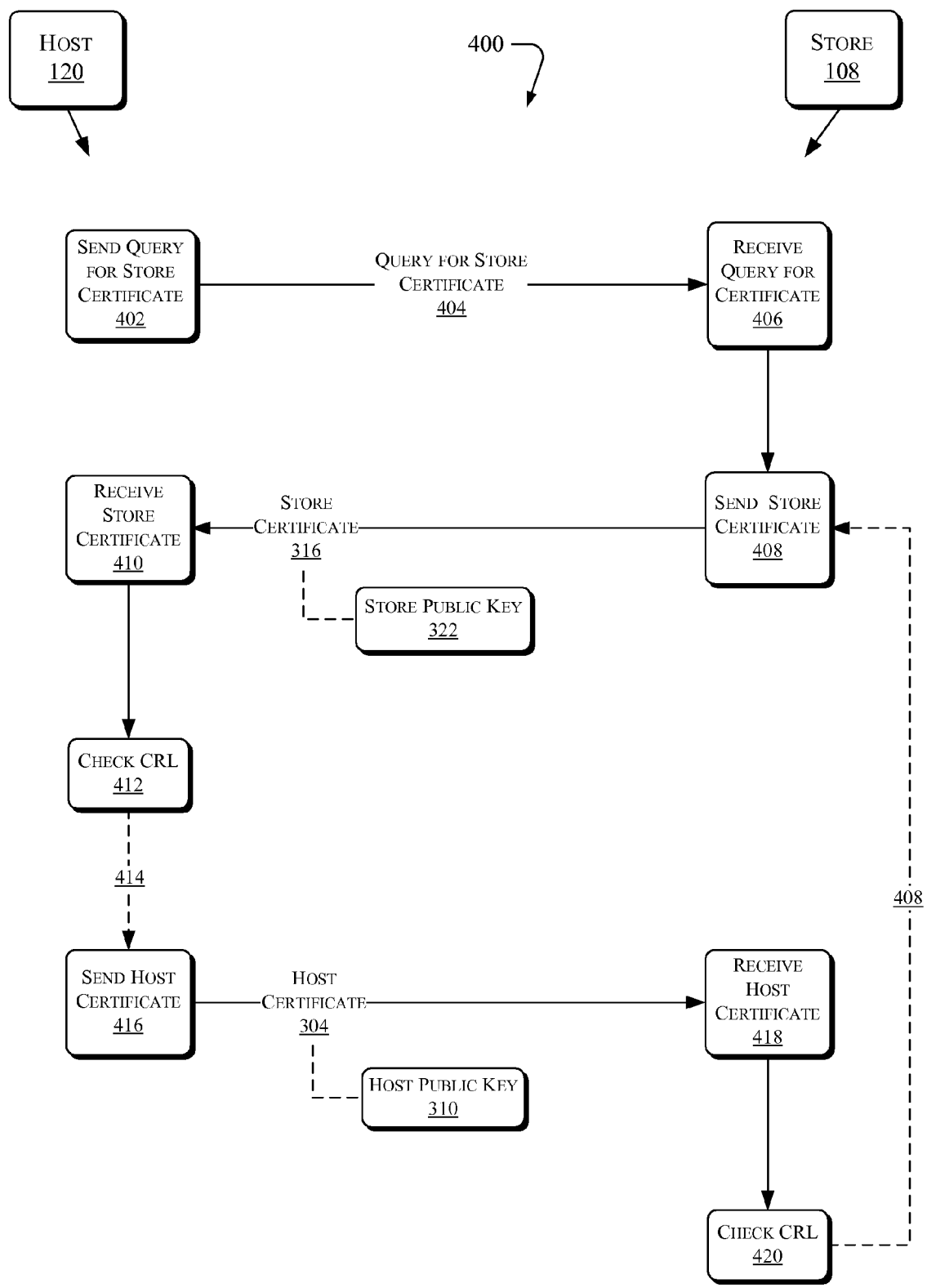
FIG. 4 is a flow diagram illustrating protocols by which the host and the store may authenticate to one another.

Having described the infrastructure 300 for issuing certificates and public and private keys to the host 120 and to the store 108 in FIG. 3, the discussion now turns to a description of how a host may authenticate to a store, now presented with FIG. 4.

FIG. 4 illustrates protocols 400 by which a host (e.g., host 120) and a store (e.g., store 108) may authenticate to one another. Completing the protocols 400 may enable the host to play content contained on the store, and the protocols establish a security session between the host and the store. The protocols 400 may run when a user (e.g., user 128) inserts the store into the host.

For convenience of description, but not to limit possible implementations, some items described previously are carried forward into FIG. 4 and denoted by similar reference signs. Additionally, for ease of description, but not limitation, FIG. 4 arranges various processes in column format to indicate the portions of the protocol 400 that the host and the store may respectively perform.

Block 402 represents sending a query for a store certificate. FIG. 4 denotes the query for the store certificate at 406. In the example shown in FIG. 4, the query 406 may pass from the host 120 to the store 108.

Block 406 represents receiving the query 404 for the store certificate. In the example shown in FIG. 4, the store may receive the query 404.

Block 408 represents sending a store certificate. In the example shown in FIG. 4, block 408 may include sending the store certificate in response to the query. In addition, block 408 may be performed only if a host certificate (e.g., 304) is valid, as indicated by line 410. Processes for determining whether the host certificate is valid are described further below.

Assuming that the host certificate is valid, the store may send a copy of its certificate in response to the query. For convenience, but not limitation, FIG. 4 carries forward the store certificate 316 from FIG. 3. The store certificate 316 as passed to the host may include the store public key (e.g., 322 in FIG. 3).

At the host, block 410 represents receiving a store certificate. In the implementation shown in FIG. 4, the host 120 may receive the store certificate 316.

Block 412 represents checking the store certificate against a CRL, to determine the validity of the store certificate. For example, the store certificate may have been revoked, or otherwise invalidated. In the implementation shown in FIG.

4, the host 120 may check the store certificate 316 against a CRL maintained by the host, against a CRL maintained by the certificate authority that issued the store certificate, or against a CRL maintained by any other entity.

If the store certificate is valid, the host 120 may participate in the rest of the protocol 400 that is shown in FIG. 4, as represented generally by the dashed line 414. However, if the store certificate is invalid, due to revocation or any other reason, the host 120 may terminate any further involvement in the protocol 400 at block 412.

Block 416 represents sending a host certificate (e.g., 304) to a store (e.g., 108). The tools described herein may perform block 416 in response to a user (e.g., 128) inserting the store into the host. An example of a host certificate is denoted in FIG. 3 at 304, and the host certificate 304 is carried forward to FIG. 4 for ease of reference. As described above in FIG. 3, the host certificate may include a host public key 310. The host certificate as sent from the host to the store may include the host public key 310, as shown in FIG. 4.

Block 418 represents receiving the host certificate. In the example implementation shown in FIG. 4, the store 108 (or software executing thereon) may perform block 404.

Block 420 represents checking the received host certificate against a certificate revocation list (CRL) to determine whether the host certificate remains valid, or has been revoked. In the example implementation shown in FIG. 4, the store 108 may perform block 420. In some instances, block 420 may include checking the host certificate against a CRL that is maintained by the certificate authority that issued the host certificate (e.g., 302 in FIG. 3). In other instances, block 420 may include checking the host certificate against a CRL that is maintained by another entity, such as the store 108. In these other instances, the CRL maintained by the other entity may be a local copy of the CRL maintained by the issuing certificate authority.

If the host certificate remains valid, and has not been revoked, the store may continue with the rest of the protocol 400 shown in FIG. 4, as represented generally by the dashed line 410. However, if the host certificate is found to be invalid (e.g., revoked), then the store may not participate further in the protocol 400. In this case, any processing performed by the store may end at block 420.

While FIG. 4 illustrates an example in which the host queries the store for a store certificate (e.g., 404), the store may also initiate the process flows 400 by querying the host for the host certificate. In the interests of conciseness, FIG. 4 does not illustrate these implementations, but in these implementations, the roles and functions illustrated in FIG. 4 may be reversed between the host and the store.

Figure 5:
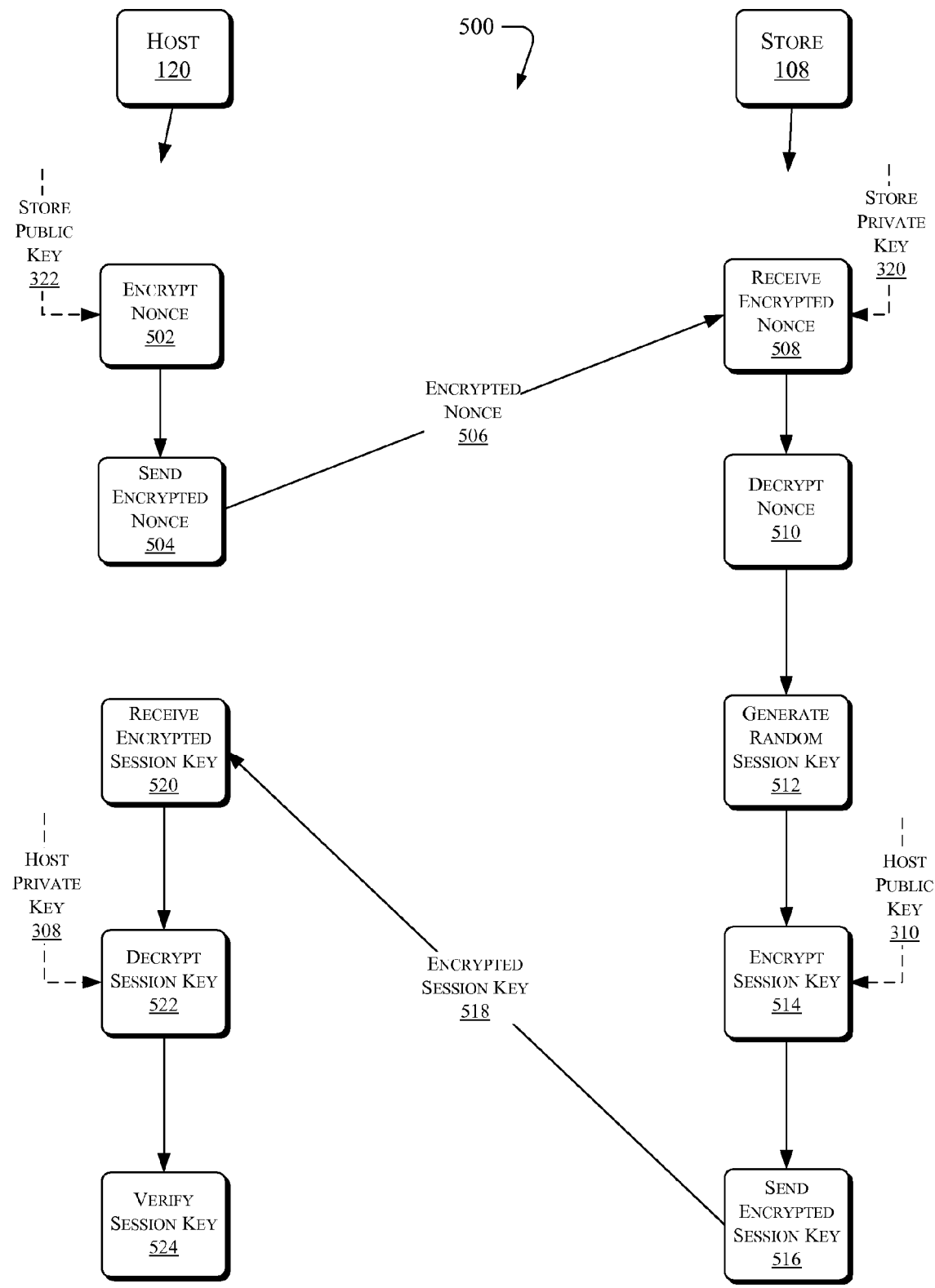
FIG. 5 is a flow diagram illustrating processes for establishing a session key between the host and the store.

FIG. 5 illustrates processes 500 for establishing a session key between the host and the store. For convenience of description, but not to limit possible implementations, some items described previously are carried forward into FIG. 5 and denoted by similar reference signs. Additionally, for ease of description, but not limitation, FIG. 5 arranges various processes in column format to indicate the portions of the protocol 500 that the host and the store may respectively perform.

Block 502 represents encrypting a nonce, using the store public key (e.g., 322). The host may obtain the store public key using the protocols 400 shown in FIG. 4. As shown in FIG. 5, the host may encrypt the nonce for sending to the store.

Block 504 represents sending the encrypted nonce. FIG. 5 denotes the encrypted nonce at 506, and block 504 may include the host 120 sending the encrypted nonce 506 to the store 108.

At the store, block 508 represents receiving the encrypted nonce 506. In the example shown in FIG. 5, the store receives the encrypted nonce.

Block 510 represents decrypting the nonce. Assuming that the nonce was encrypted using the store's public key, block 510 may include decrypting the nonce using the store's private key (e.g., 320).

Block 512 represents generating a random session key. In some implementations, block 432 represents generating the random session key based on the encrypted nonce received in block 508. In the example shown in FIG. 5, the store generates the random session key. In other implementations, block 512 represents generating the random session key not based on the nonce. In these latter implementations, the store may send the nonce back to the host in some other form to authenticate itself to the host.

Block 514 represents encrypting the random session key. Block 514 may include encrypting the session key using a public key associated with the host. FIG. 5 carries forward an example of a host public key at 310. The store may obtain the host public key using the protocols 400 shown in FIG. 4.

Block 516 represents sending the encrypted session key. FIG. 5 denotes the encrypted session key at 518. In the example shown in FIG. 5, the store may send the encrypted session key 518 to the host.

Block 520 represents receiving the encrypted session key 518. In the example shown in FIG. 5, the host receives the encrypted session key from the store 108.

Block 522 represents decrypting the session key 518. Assuming that the store encrypted the session key using the host's public key, block 522 may include decrypting the session key using the host's private key (e.g., 308).

Block 524 represents verifying the session key. In implementations where the store generates the session key based on the nonce, block 524 may include verifying that the session key is based on the nonce that was sent to the store in block 504. In implementations where the store authenticates to the host by returning the nonce, rather than generating the session key based on the nonce, block 524 may include verifying that the store returned the correct nonce.

Assuming that the host and the store successfully complete the protocols 400 and 500, the host and the store may then secure their communications with each other. For example, the host and the store may encrypt any further communications between themselves using the session key. Additionally, once the host and the store complete the protocols 400 and 500, the host and the store have authenticated to one another, and have exchanged public keys with one another. More specifically, in the examples shown in FIGS. 4 and 5, the host uses the store's public key 322 to encrypt a nonce (block 502), which is then sent to the store. In turn, the store uses this nonce to generate the session key, and encrypts the session key with the host's public key (block 514).

FIGS. 4 and 5 illustrate examples in which the host and the store perform the processing represented in the various blocks shown in the columns appearing under the host and the store. However, it is noted that these examples are non-limiting, and the roles of the host and store could be reversed without departing from the scope and spirit of the description herein. The protocols 400 shown in FIG. 4 result in the host and the store mutually authenticating one another. Thus, the examples shown in FIGS. 4 and 5 do not limit possible implementations of the description herein.

Figure 6:
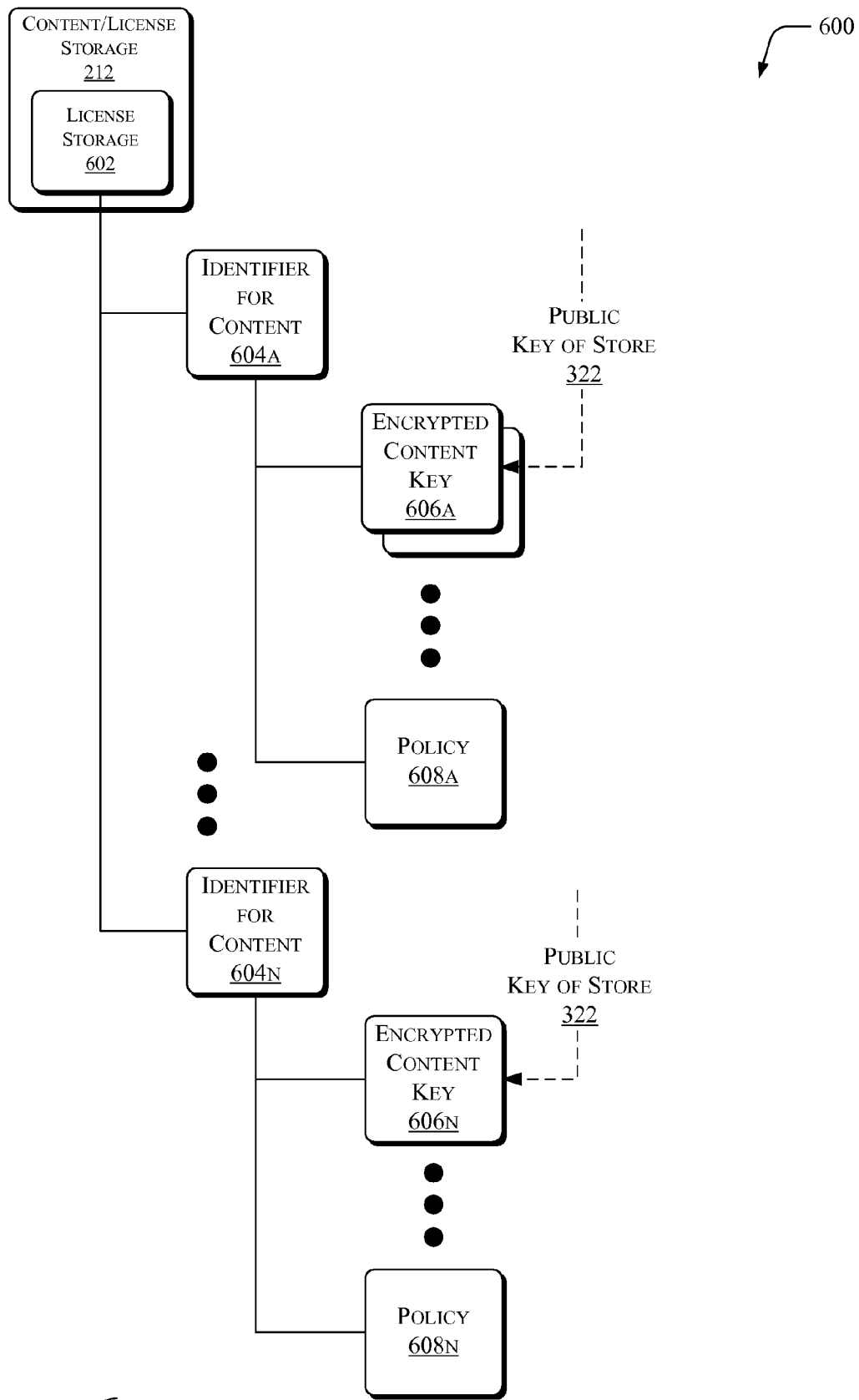
FIG. 6 is a block diagram illustrating data structures for implementing a license storage area on the store.

Having described the protocol 500 in FIG. 5, the discussion now turns to a more detailed description of the license storage area on the stores, now presented with FIG. 6.

FIG. 6 illustrates data structures 600 suitable for implementing a license storage area. For convenience of description, but not to limit possible implementations, some items described previously are carried forward into FIG. 6, and are denoted by similar reference signs.

Recalling from FIG. 2, the store (e.g., 108) may include a computer readable storage medium (e.g., 210), which may include a license storage area (e.g., 212). The license storage area may include the data structures 600, which in turn contain information relating to various licenses cryptographically bound to the store. In the example shown in FIG. 6, the license storage area may include one or more license storage records 602 corresponding to an instance of licensed content contained in the store. For convenience only, FIG. 6 shows one record 602, but implementations of the data structures 600 could contain any number of records 602, depending on how many instances of licensed content the store contains.

Turning to the records 602 in more detail, these records may contain key identifier fields 604. These key identifier fields 604 may provide a search or index field that facilitates searching the data structures 600 to locate a license for a given instance of licensed content, as detailed further below. For convenience only, FIG. 6 shows two key identifier fields 604*a* and 604*n*, but implementations of the data structures 600 could contain any number of key identifier fields 604, depending on how many instances of licensed content the store contains.

The key identifier fields 604 may be associated with at least one content key field 606. For convenience only, FIG. 5 shows two content key fields 606*a* and 606*n*, but implementations of the data structures 600 could contain any number of content key fields 606, depending on how many instances of licensed content the store contains. In some cases, the content identifier 604 may be associated with multiple instances of the encrypted content keys, as shown at 606*a*.

To promote security and protection, the content keys may be encrypted with the public key of the store (e.g., 322), such that they may only be decrypted with the private key of the store. In another example, the content keys may be encrypted with an intermediate symmetric key. In this manner, even if the content keys are somehow misappropriated by a malicious party, the content keys would be of no value to the malicious party, unless the store's private key were also compromised. Generally, best practices related to key management dictate that implementations of public-private key infrastructures take great care to protect the private key from compromise through hardware and/or software mechanisms. For example, these best practices may suggest secure hardware implementations.

The content identifier fields 604 may also be associated with at least one policy field 608. For convenience only, FIG. 6 shows two policy fields 608*a* and 608*n*, but implementations of the data structures 600 could contain any number of policy fields 608, depending on how many instances of licensed content the store contains.

These policy fields 608 may store policy information that enables playback devices, such as the hosts 120, to validate the license that is purportedly bound cryptographically to the store. Additionally, the policy fields may enable the host to determine whether particular operations (e.g., playbacks, copies, transfers, or the like) are permitted under the terms of the license bound cryptographically to the store.

The policy fields 608 may include information indicating any restrictions or conditions applicable to playing back, copying, transferring, accessing, or performing any other operations on the licensed content. The license for the content as granted by, for example, the license server 116, may specify the policies as stored in the fields 608. Examples of restrictions may include limitations on how many times the content may be played back, how much of the content may be played back, whether the content may be copies to other stores, or the like.

Figure 7:
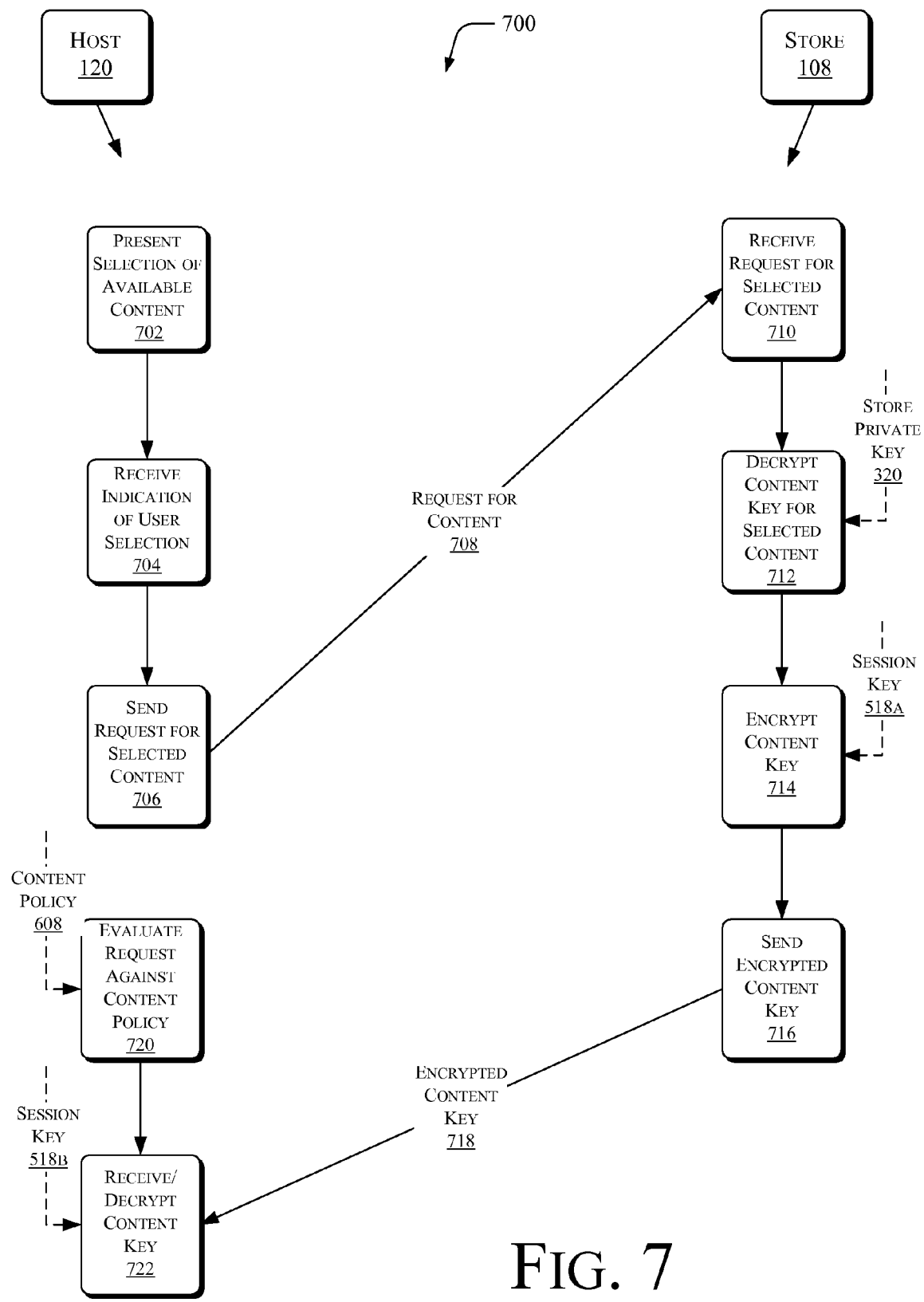
FIG. 7 is a flow diagram illustrating protocols that may be performed when a user selects content on the host for access, with the host evaluating a request from the user against licensing policies applicable to the selected content.

Having described the data structures 600 in FIG. 6, the discussion now proceeds to a description of process flows that may be performed when a user selects content on a host for access, now presented in FIG. 7.

FIG. 7 illustrates protocols 700 that may be performed when a user selects content on a host for access. For convenience of description, but not to limit possible implementations, some items described previously are carried forward into FIG. 7 and denoted by similar reference signs. Additionally, for ease of description, but not limitation, FIG. 7 arranges various processes in columns to indicate the portions of the protocols 700 that the host and the store may respectively perform.

Block 702 represents presenting a selection of available content to a user. For example, the host 120 may present this selection in menu form to the user, after the user inserts the store 108 into the host. When the user inserts the store into the host, the host may examine the content/license storage area (e.g., 212) of the host to locate any available content on the host. The host may then extract identifiers associated with different instances of the available content to populate the selection of available content as presented to the user. This selection of available content may include a plurality of graphic elements, respectively representing the different instances of content available on the store.

The user may request that the host perform some operation on the selected content. For example, the user may request that the host playback the selected content, copy the selected content, or perform any other similar operation made available to the user.

Block 704 represents receiving an indication that the user has selected an instance of content. For example, the user may operate an input device to place one of the graphic elements in focus, and may then activate some control to select the graphic element that is focus. Block 704 may include receiving electrical signals, software events, or other suitable notifications that the user has made a selection.

Block 706 represents sending a request for the content selected by the user. Block 706 may include the host 120 sending the request, denoted generally at 708, to the store 108.

At the store, block 710 represents receiving the request for the content selected by the user. Block 710 may include the store receiving the request 708 from the host.

Block 712 represents identifying one or more content keys associated with the content selected by the user. It is noted that multiple content keys may be processed in the process flows shown in FIG. 7, as well as in FIGS. 8-10 below. FIG. 6 shows examples of content keys at 606. If the content keys are stored in encrypted form, block 712 may include decrypting the content keys. More specifically, if the content keys were encrypted using the store public key, then block 712 may include decrypting the content keys using the store private key (e.g., 320). Recall that the store and the host have authenticated each other above using, for example, the protocol 400 shown in FIG. 4. Therefore, some level of mutual trust now exists between the host and the store, and this trust may enable the store to provide the content key to the host, using the techniques shown in FIG. 7.

Block 714 represents encrypting the content key using a session key. FIG. 5 shows a suitable example of a session key that is created at block 512, and shows an encrypted version of the session key at 518. FIG. 7 denotes at 518*a* a share of the session key as assigned to the store. Because the session key is known only to the host and to the store, the store may securely transmit the content key to the host by encrypting it with the session key.

Block 716 represents sending the encrypted content key, which is denoted generally at 718. For example, the store may send the encrypted content key 718 to the host.

At the host, block 720 represents evaluating the operation requested by the user against any content policy applicable to the content selected by the user. FIG. 7 carries forward an example of a content policy at 608. In an example implementation, the policy or the entire license may be signed using a key associated with whoever issued or derived the license. Block 720 may include evaluating the policy to check that the policy has not been tampered with, before decrypting the content key. This evaluation may include verifying the signature of the license.

In the example implementation shown in FIG. 7, the host may perform block 720. This implementation may be suitable when the host has more processing power or capability than the store. However, in some cases, the situation is reversed, and the store may have more processing power than the host. In these cases, an implementation shown in FIG. 9 below may be appropriate.

Figure 8:
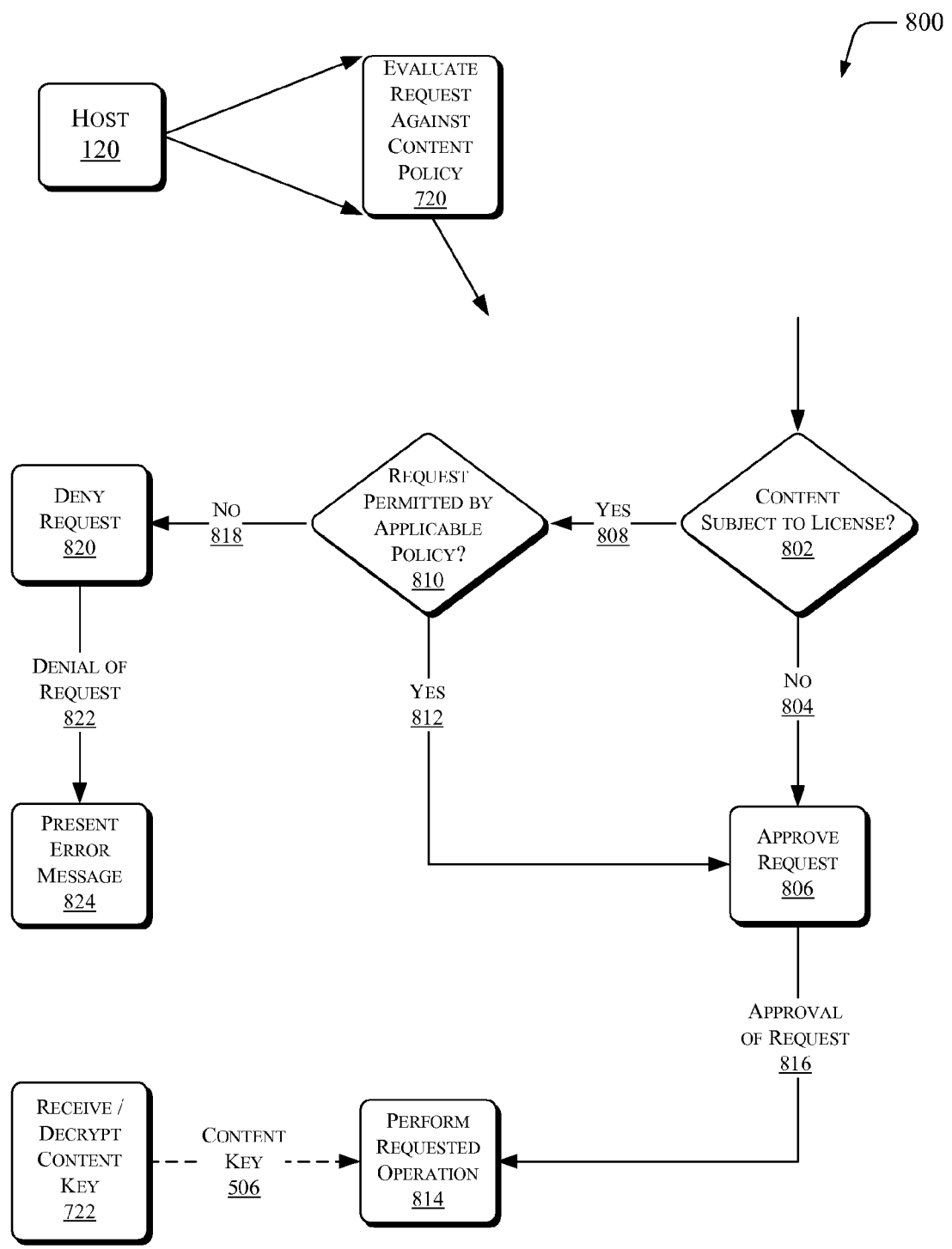
FIG. 8 is a flow diagram illustrating additional aspects of the process flows shown in FIG. 7.

FIG. 7 illustrates evaluation block 720 in block form for ease of illustration. However, additional details of this determination are shown in FIG. 8, and discussed below.

Assuming that the evaluation performed in block 720 is positive, block 722 represents receiving the encrypted content key 618. In the example shown in FIG. 7, the host may receive the encrypted content key. In cases where the store encrypted the content key using its share of the session key 518, the host may decrypt the content key using its share of the session key, denoted at 518*b*.

Using the content key, the host may access the content used to comply with the request received in block 704. In this manner, the host may validate that the policy has not been maliciously altered, by verifying the license signature.

Some implementations may use the intermediate session key that was described above. In these implementations, block 714 may include encrypting the content key (e.g., 606 in FIG. 6 or 718 in FIG. 7) using the intermediate session key. In turn, block 722 may include decrypting the content key using this intermediate key. The intermediate session key may be encrypted using the store private key (e.g., 320).

FIG. 8 illustrates process flows 800 that provide further aspects of evaluating the operation requested by the user against any policy applicable to the content selected by the user. For convenience of description, but not to limit possible implementations, some items described previously are carried forward into FIG. 8 and denoted by similar reference signs.

Decision block 802 represents evaluating whether the content selected by the user is subject to a policy in a license. If not, the process flow 800 may take No branch 804 to block 806, which represents approving the request from the user.

Returning to block 802, if the selected content is subject to a license, then the process flow 800 may take Yes branch 808 to decision block 810. Decision block 810 represents evaluating whether the request from the user is permitted by any policy (e.g., 608) applicable to the selected content.

From block 810, if the request is permitted by any applicable policy, then the process flow 800 may take Yes branch 812 to block 806. Block 806 represents approving the request.

Block 814 represents performing the operation requested by the user. For example, block 806 may include communicating an approval 816 of the request from the user, and the process flow 800 may perform block 814 in response to the approval 816. Block 814 may include receiving the decrypted content key 506 from block 722 in FIG. 7.

In some possible implementations, block 814 may include playing or otherwise presenting the selected content to the user. In other possible implementations, block 814 may include copying or transferring the selected content as requested by the user. These examples are given only for ease of description, but not to limit possible implementations.

Returning to decision block 810, if the request is not permitted by any applicable policy, then the process flow 800 may take No branch 818 to block 820. Block 820 represents denying the request submitted by the user, as not permitted by license policy applicable to the selected content. Block 820 may include sending a denial 822 of the request.

Block 824 represents presenting an error message or other suitable notification to the user who submitted the request denied in block 820. In some instances, block 824 may include indicating to the user that the request was denied because it was not permitted by the policy applicable to the selected content. Additionally, block 824 may include providing the user with one or more options for obtaining a license that would permit the requested operation.

Having described the above process flow 800 for evaluating the operation requested by the user against any applicable content policies, a few observations are noted. The implementations described in FIGS. 7 and 8 may be suitable when the host has more processing capacity than the store. In this situation, the host may assume the role of evaluating the request against the content policy (e.g., 720 in FIGS. 7 and 8), to relive a less-powerful store from this processing.

Figure 9:
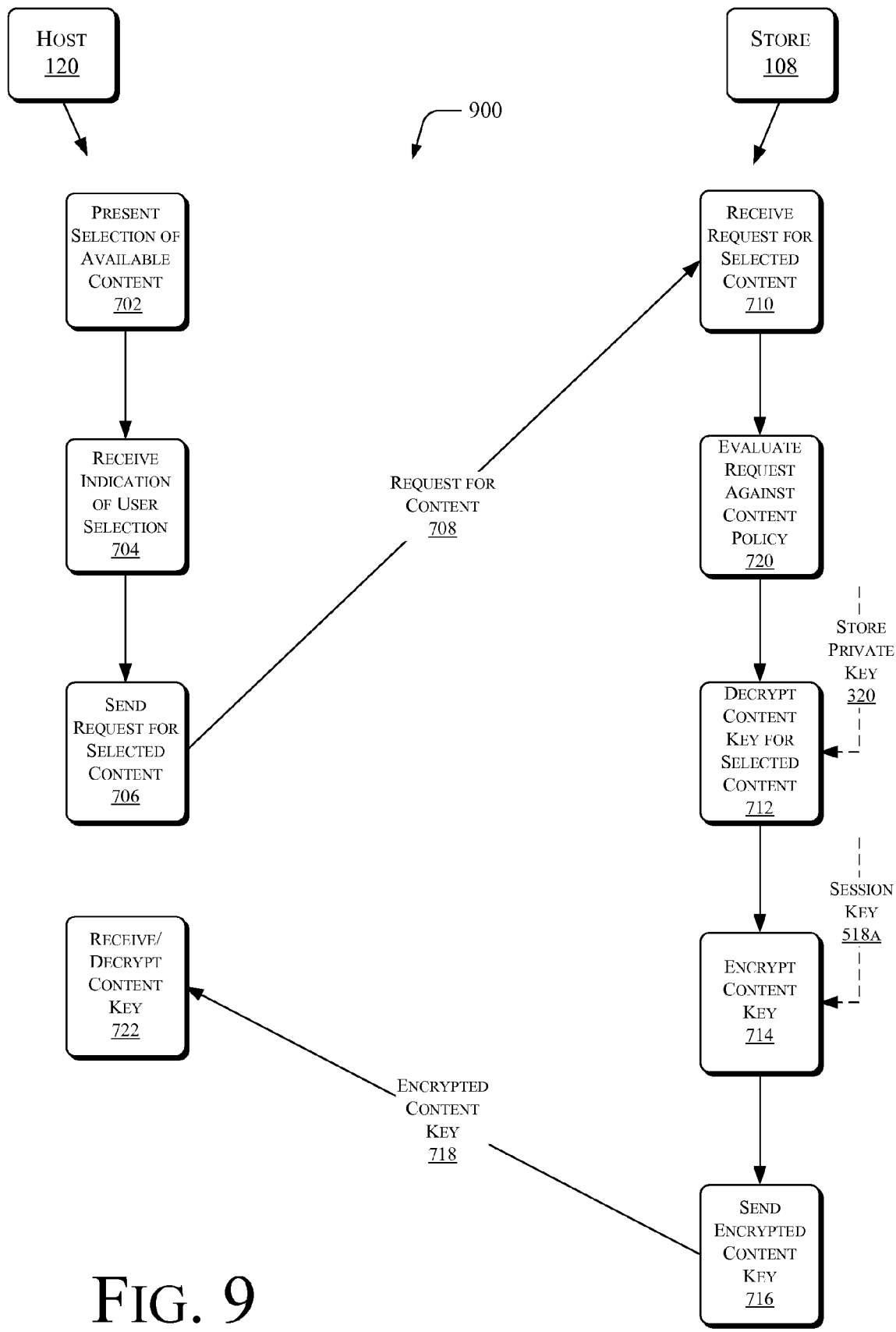
FIG. 9 is a flow diagram illustrating protocols that may be performed when the user selects content on the host for access, with the store evaluating the request from the user against licensing policies applicable to the selected content.
Figure 10:
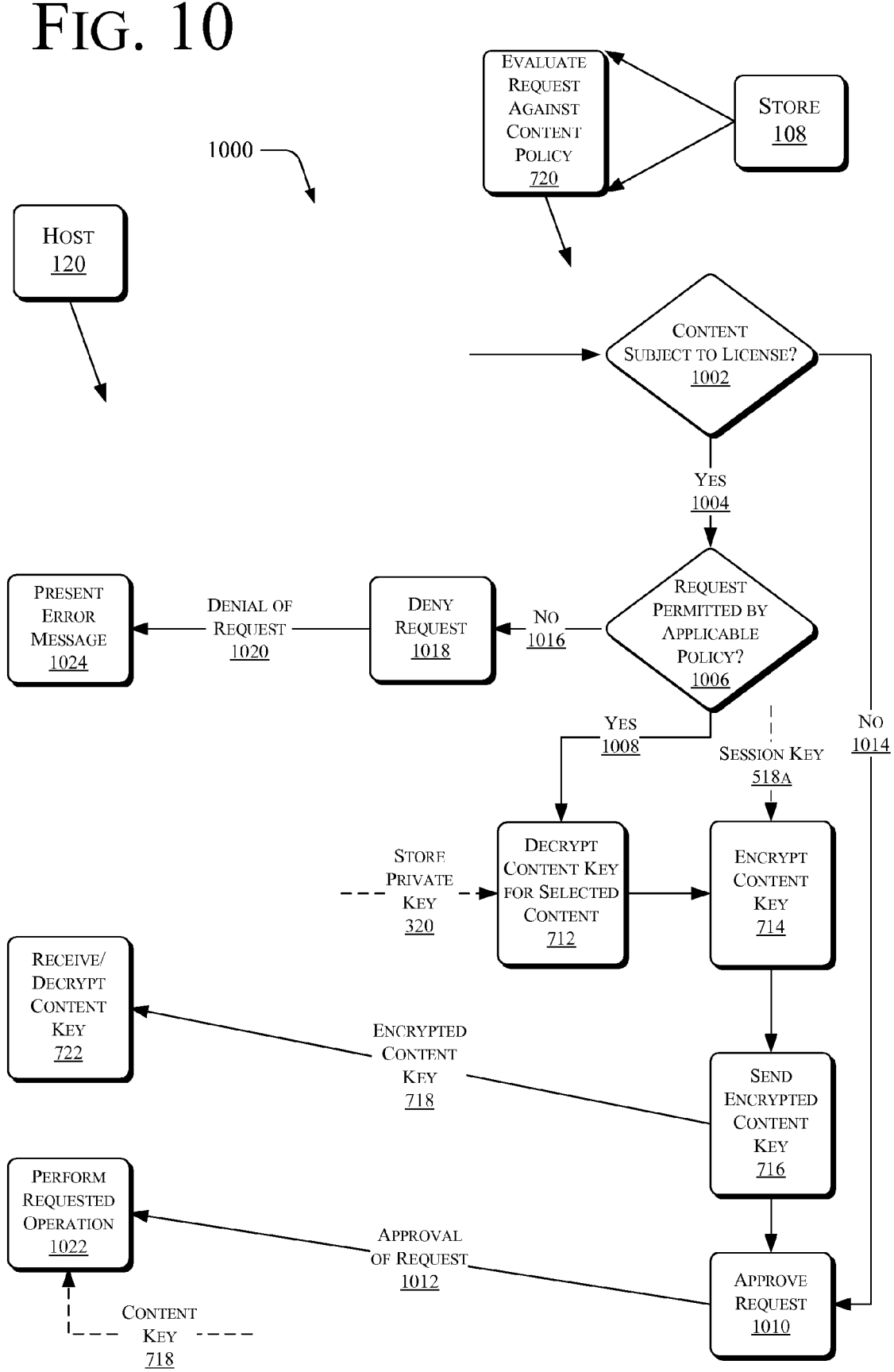
FIG. 10 is a flow diagram illustrating additional aspects of process flows shown in FIG. 9

In other situations, however, the store may have more processing capacity than the host. In these instances, the store may assume the role of evaluating the request against the content policy, thereby relieving a less-powerful host from this processing. FIGS. 9 and 10 illustrate these latter scenarios.

FIG. 9 illustrates protocols 900 that may be performed when a user selects content on a host for access. For convenience of description, but not to limit possible implementations, some items described previously are carried forward into FIG. 9 and denoted by similar reference signs. Additionally, for ease of description, but not limitation, FIG. 9 arranges various processes in column format to indicate the portions of the protocol 900 that a host (e.g., 120) and a store (e.g., 108) may respectively perform. More specifically, certain processing blocks related to the protocol 900 may be similar to those described above in FIG. 7 with the protocol 700. Thus, to avoid duplicate description, these processing blocks are denoted in FIGS. 9 and 10 by the same reference numbers, but may be performed by different components than shown in FIGS. 7 and 8.

Turning to the protocols 900 in more detail, the blocks 702, 704, and 706 are carried forward from FIG. 7, as well as the request for the content selected by the user, denoted at 708. As illustrated and discussed above in FIG. 7, the host may perform the blocks 702-706, and may submit the request 708 to the store. In turn, the store may perform blocks 710 and 712, as described above in FIG. 7. However, unlike the example implementations shown in FIG. 7, the implementation in FIG. 9 enables the store to perform the evaluation block 722. Thus, FIG. 9 shows the request evaluation block 720 in the column corresponding to the store, rather than that of the host (as shown in FIG. 7).

Assuming the result of the evaluation block 720 is positive, the store may then perform block 712, which represents decrypting the content key for the selected content. Block 712 may include decrypting by the store private key 320. Additionally, FIG. 9 carries forward blocks 714, 716, and 722 from FIG. 7, along with the encrypted content key 718. The previous description of blocks 714, 716, and 722 and the data flow 718 applies also to FIG. 9, and in the interests of conciseness, is not repeated here. FIG. 9 also carries forward the shares of the session key, denoted at 518*a* and 518*b*.

FIG. 10 illustrates aspects of process flows 1000 for evaluating the request against any applicable content policy. For convenience of description, but not to limit possible implementations, some items described previously are carried forward into FIG. 10 and denoted by similar reference signs. Additionally, for ease of description, but not limitation, FIG. 10 arranges various processes in columns to indicate the portions of the process flows 1000 that a host (e.g., 120) and a store (e.g., 108) may respectively perform.

In the implementation shown in FIG. 10, the store (e.g., 108) may perform certain processing represented by the request evaluation block 720. Recall that in FIG. 8, this processing was performed by the host (e.g., 120). However, in FIG. 10, the host and/or the store may perform parts of the processing associated with request evaluation block 720, as now described in more detail.

Block 1002 represents evaluating whether content referenced in the request is subject to a license. If the content is subject to a license, the license would typically specify one or more policies (e.g., 608) that indicate how or whether the content may be accessed or disseminated. If the content is subject to a license, the process flows 1000 may take Yes Branch 1004 to evaluation block 906, which represents determining whether the request is permitted by any policies applicable to the content.

From evaluation block 1006, if the request is permitted by applicable policies, then the process flows 1000 may take Yes branch 1008 to block 712, which is carried forward from FIG. 7. Block 712 represents decrypting the content key for the selected content, using the store private key (e.g., 320). Block 714 represents encrypting the content key using the session key (e.g., 518*a*, or an intermediate session key). Block 716 represents sending the encrypted content key (e.g., 718) to the host. At the host, block 722 represents receiving and decrypting the content key.

Returning to the store, block 1010 represents approving the request. As shown in FIG. 10, the store may communicate the approval to the host, as represented at 1012.

Returning to evaluation block 1002, if the content is not subject to a license, then the process flows 1000 may take No branch 1014 directly to block 1010. As described above, block 1010 represents approving the request.

Returning to evaluation block 1006, if the request is not permitted by applicable policy, then the process flows 1000 may take No branch 1016 to block 1018, which represents denying the request. As shown in FIG. 10, the store may communicate the denial to the host, as represented at 1020.

At the host, block 1022 represents performing the requested operation relating to the content. Block 1022 may include performing the requested operation in response to receiving the approval 1012. To perform the requested operation, the host may utilize the content key decrypted in block 722. FIG. 10 carries forward an encrypted version of the content key at 718.

Also at the host, block 1024 represents presenting an error message or other suitable communication to a user. For example, block 1024 may include indicating to the user that a requested operation is not permitted by licenses and/or policies applicable to the content. Block 1024 may also include indicating to the user how or where he or she may obtain one or more licenses to perform the requested operation.

Figure 11:
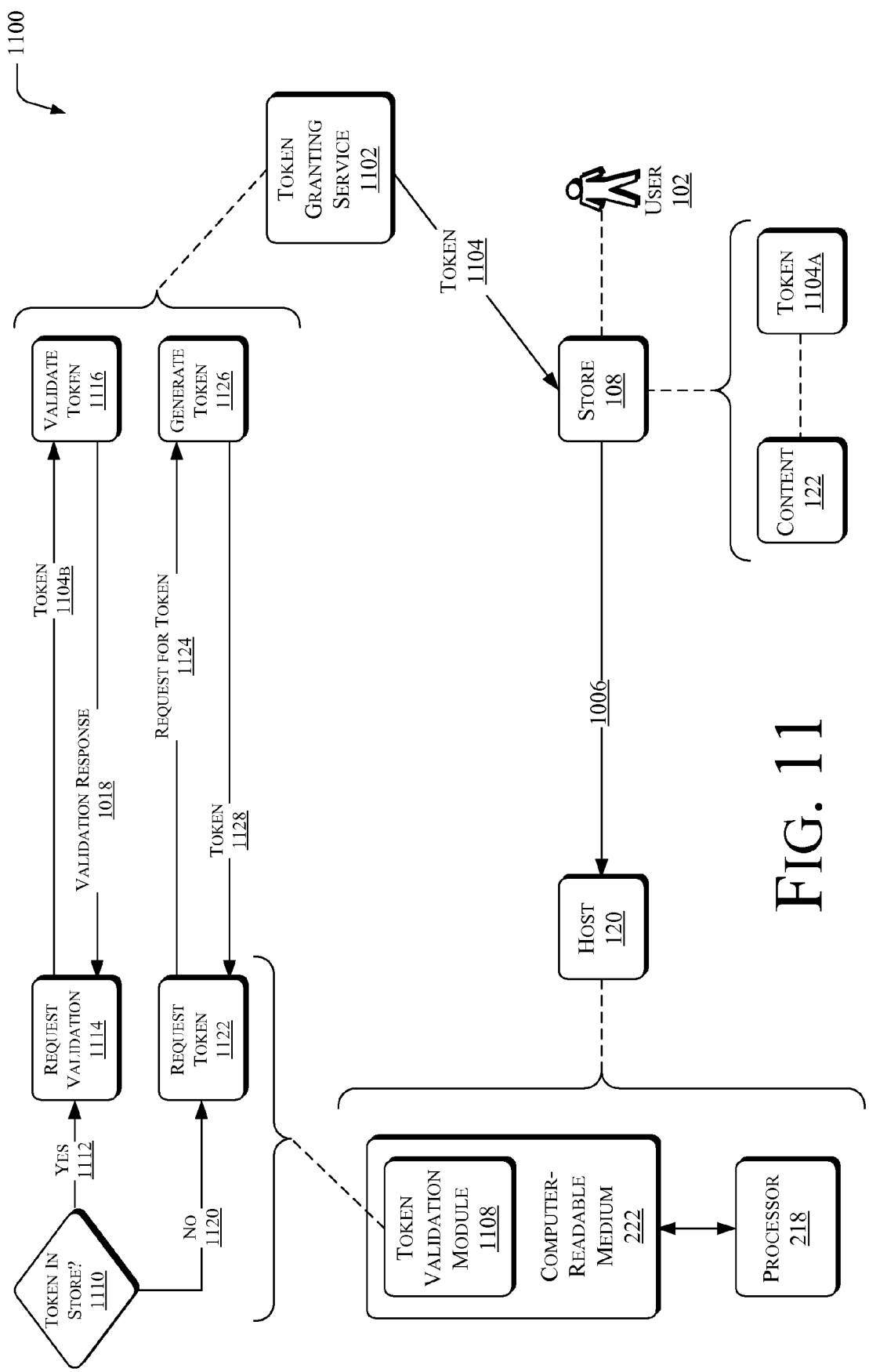
FIG. 11 is a block diagram illustrating operating environments that include a token granting service.

Having described the process flows 1000 for evaluating the request against applicable content policies, the discussion now proceeds to a description of operating environments that include a token granting service, now presented with FIG. 11.

FIG. 11 illustrates operating environments 1100 that include a token granting service, denoted generally at 1102. Examples of such tokens may include licenses. For convenience of description, but not to limit possible implementations, some items described previously are carried forward into FIG. 11 and denoted by similar reference signs.

In some instances, the user may download content 122 from a download server associated with, for example, the content/media source 106. As shown in FIG. 11, content may be loaded into stores 108. Some of this content may be licensed content. Any licensed content may be associated with unique content key identifiers, or "keys" for short. In the implementations shown in, for example, FIG. 1, a license server (e.g., 116) may use a seed value to generate these keys. In instances where the license server and the download server are under common control, the license server may "trust" the download server, and may share the seed with the download server. In these instances, the implementations shown and described above may be suitable.

In other instances, however, the content to be played may not have been downloaded from a download server that is trusted by the license server. For example, the content may be pre-loaded onto a store (e.g., 108) by a manufacturer of the card, or by a retailer selling the store, and these operations may be controlled separately from the license server. In these instances, the operating environments 1100 shown in FIG. 11 may be suitable, with the token granting service 1002 providing functions somewhat similar to the license server. The token granting service 1102 may provide a level of indirection that enables license administration between entities that do not trust one another and without sharing sensitive information (e.g., the seed for generating the content keys) between these entities.

Turning to the token granting service in more detail, it may generate a token 1004 to be stored onto the card, and may associate this token with some instance of licensed content. This token may indicate that any host into which the store is inserted is allowed to access the licensed content, consistent with any applicable license policies.

The token granting service may communicate this token, as associated with related content, to a manufacturer of the store 108, or to a retailer of the store. In turn, the retailer or manufacturer of the store may load the content and related token onto the store. FIG. 11 shows an example of the store 108 containing representative content 122 and an associated token, denoted at 1104*a*. The association between the content and the token is denoted generally by the dashed line connecting the blocks 122 and 1104*a*. However, this example is non-limiting, and is presented only for convenience. Stores 108 could contain any number of content-token instances, or may contain content instances that are not associated with token.

A user 102 may insert the store 108 into a host (e.g., 120), as represented generally by a line 1106. The host may include one or more processors and computer readable storage media, which are denoted by the reference numbers 218 and 222, respectively. These references are carried forward from FIG. 2 for convenience but not limitation.

The computer readable storage media 222 may include a token validation module 1108, which may process the store 108 when it is inserted into the host 120. More specifically, the token validation module 1108 may interact with the token granting service 1102 to determine whether the host may play any content (e.g., 122) that is on the store.

The interaction between the token validation module 1108 and the token granting service 1102 may include at least some of the processing shown in FIG. 11. For example, block 1110 represents evaluating whether the store contains any tokens. If the store contains at least one token (e.g., 1104a), the token validation module may take Yes branch 1112 to block 1114, which represents requesting validation of any tokens found on the store. At 1104b, FIG. 11 represents the token as extracted from the store and sent for validation.

For ease of illustration and description, FIG. 11 illustrates scenarios in which the token granting service 1102 also validates tokens. However, these scenarios are non-limiting, and different entities may issue the tokens and validate the tokens without departing from the scope and spirit of the description herein.

In the example provided in FIG. 11, block 1116 represents validating the input token received from the token validation module. Block 1116 may result in a determination that the token is either valid or invalid. For example, the token validation module may determine whether it has issued the token in association with particular content, or may parse the token to assess its validity.

The token granting service may return a validation response 1118 to the token validation module on the host, with this validation response 1118 indicating whether the token was found to be valid or invalid. If the token granting service was able to validate the token, then the host may play the content associated with that token. If the token granting service was not able to validate the token, then the host may take some secondary action, such as presenting the token to another validation service, presenting an error message to a human user, or the like.

Returning to the evaluation block 1110, if the store that was inserted into the host does not contain any tokens related to licensed content on the store, then the token validation module may take No branch 1120 to block 1122. Block 1122 represents requesting a token from the token granting service 1102, with the line 1124 representing the request for the token.

At the token granting service, block 1126 represents generating a token in response to the request 1124, and associating the new token with content contained on the store (e.g., 122). Block 1126 may include prompting a human user to obtain any payments associated with obtaining a license to access the content.

FIG. 11 depicts tokens 1128 that are obtained as a result of processing represented in block 1126. Block 1126 may include forwarding these tokens to the token validation module 1108. In the example shown in FIG. 11, block 1122 may include receiving the new token(s) 1128, although it is noted that another process within the token validation module 1108 may receive the token.

Figure 12:
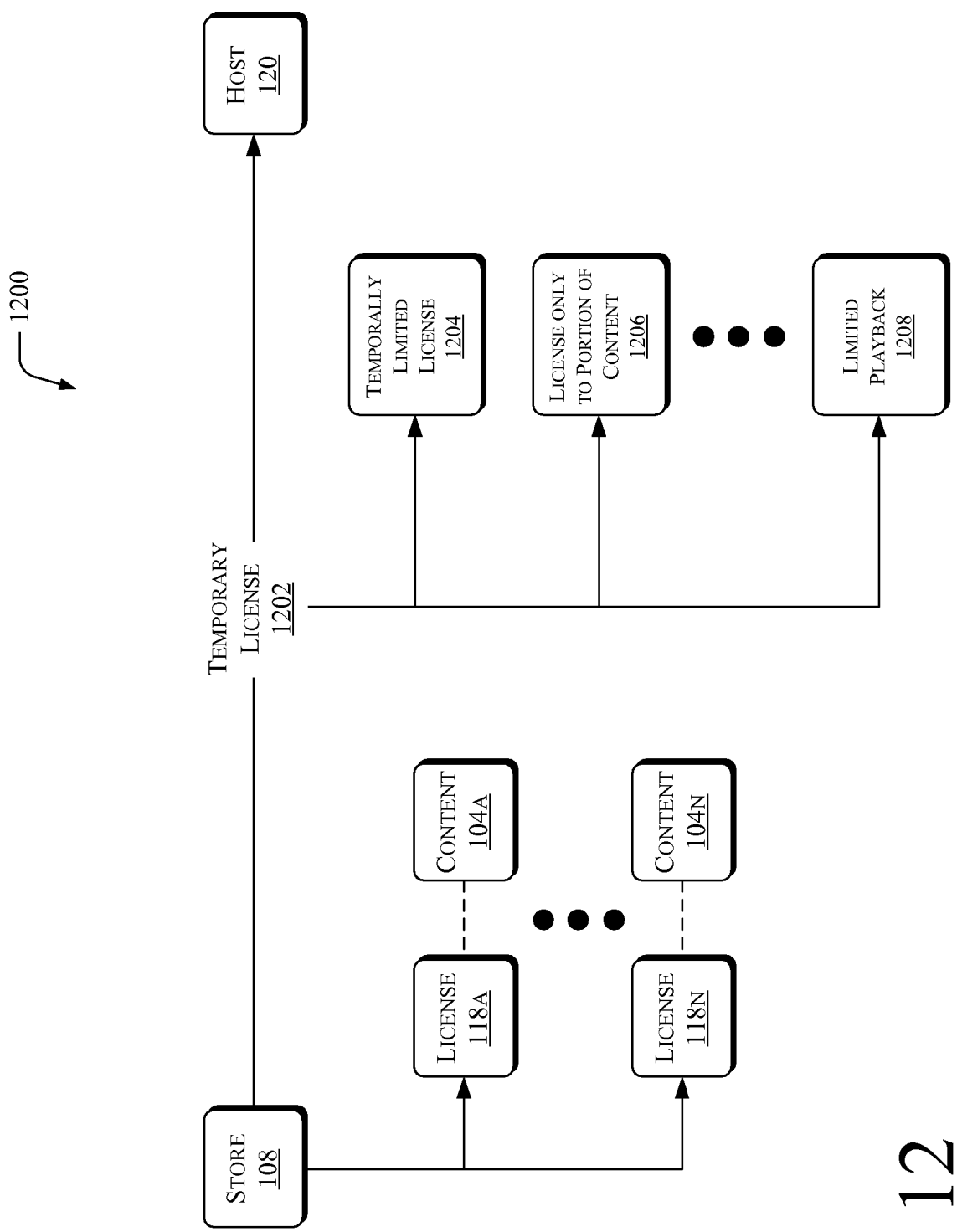
FIG. 12 is a block diagram illustrating operating environments in which the stores may issue temporary licenses or certificates to the hosts.

Having described the operating environments relating to the token granting service in FIG. 11, the discussion now proceeds to a description of operating environments in which stores may issue temporary licenses or certificates to hosts, now presented with FIG. 12.

FIG. 12 illustrates operating environments 1200 in which stores (e.g., 108) may issue temporary licenses or certificates 1202 to hosts (e.g., 120). For convenience of description, but not to limit possible implementations, some items described previously are carried forward into FIG. 12 and denoted by similar reference signs.

The stores 108 may contain one or more licenses (e.g., 118), with FIG. 12 showing two examples of such licenses at 118a and 118n. The licenses may be associated with respective instances of content (e.g., 104), with FIG. 12 showing two examples of content at 104a and 104n.

In any of the scenarios illustrated in FIGS. 1-11 and described herein, the store may issue the temporary license or certificate 1202 to the host, assuming that the store has authenticated the identity of the host. This temporary certificate or license 1202 may be considered a sub-license of any of the licenses 118.

Using this temporary certificate or license 1202, the host may access and play the content corresponding to the temporary license or certificate. The temporary certificate or license may be temporally limited, as represented at 1204. The temporally limited license 1204 may enable the host to access the content for a pre-defined period of time, with the certificate or license expiring after this period of time.

In other examples, the temporary certificate or license 1202 may permit access to only certain portions of the content, as represented at 1206. This type of temporary license may be viewed as a type of preview license, in which the host may play only certain portions of the content, until a user or the host obtains a full license. This scenario may occur when, for example, a store is pre-loaded with content by a retailer or manufacturer. In these pre-loaded content scenarios, the store may contain only a preview license, but may nevertheless offer full licenses through the host.

In still other examples, the temporary certificate or license 1202 may permit a predefined number of accesses to the content, as represented at 1208. For example, the temporary license may permit only one playing of the content, with the temporary license expiring afterwards. However, this temporary license may permit any number of playbacks as appropriate in different implementations.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. A machine-readable storage medium encoded with machine-readable instructions that, when executed by a machine, cause the machine to perform an authentication protocol comprising:
    generating a nonce;
    sending the nonce to a store associated with a host, the store being a portable storage device;
    receiving a session key from the store to authenticate the store to the host, the session key being generated using the nonce and encrypted using a public key associated with the host; and associating a license with the store and content contained in the store such that when the store is removed from the host and inserted into a second host, the license is transferred with the store such that the license remains associated with the store and the host does not retain residual rights to render the content, wherein the second host processes the store to determine whether the second host is authorized to render the content based at least in part on whether the store includes one or more tokens.

2. The machine-readable storage medium of claim 1, the authentication protocol further comprising encrypting the nonce before sending the nonce to the store.

3. The machine-readable storage medium of claim 2, wherein the nonce is encrypted using a public key associated with the store.

4. The machine-readable storage medium of claim 1, the authentication protocol further comprising receiving a store certificate from the store, wherein the store certificate includes a store public key.

5. The machine-readable storage medium of claim 4, the authentication protocol further comprising checking validity of the store certificate against at least one certificate revocation list.

6. The machine-readable storage medium of claim 4, the authentication protocol further comprising encrypting the nonce using the store public key.

7. The machine-readable storage medium of claim 6, the authentication protocol further comprising sending a host certificate to the store.

8. The machine-readable storage medium of claim 1, wherein the associating a license with content contained in the store includes binding the license to the session key from the store after completing the authentication protocol, the license enabling a host to access content contained on the store.

9. A mobile media player device that includes the machine-readable storage medium of claim 1.

10. A machine-readable storage medium encoded with machine-readable instructions that, when executed, cause a machine to perform operations comprising:
receiving an encrypted nonce from a host associated with a store, the store being a portable storage device that is detachably coupled to the host;
generating a session key based at least in part on the encrypted nonce;
sending the session key to the host to authenticate the portable storage device;
binding to the store one or more licenses associated with content contained in the store such that the one or more licenses are transferable with the store and are maintained in the store subsequent to a transfer of the content, the host determining that the host is authorized to render the content by:
determining whether the store contains one or more tokens;
parsing the one or more tokens to determine whether the one or more tokens are valid based at least in part on a determination that the store contains the one or more tokens; and
requesting a token from a token granting service based at least in part on a determination that the store does not contain the one or more tokens.

11. The machine-readable storage medium of claim 10, wherein the operations further comprise receiving a host certificate, the host certificate including at least a public key associated with the host.

12. The machine-readable storage medium of claim 11, wherein the operations further comprise checking the host certificate against at least one certificate revocation list.

13. The machine-readable storage medium of claim 10, wherein the operations further comprise receiving a query for a store certificate.

14. The machine-readable storage medium of claim 10, wherein the operations further comprise sending a store certificate, the store certificate including at least a public key associated with the store.

15. The machine-readable storage medium of claim 10, wherein the nonce is encrypted with a public key associated with the store.

16. The machine-readable storage medium of claim 10, wherein the operations further comprise encrypting the session key using a public key associated with the host.

17. The machine-readable storage medium of claim 10, wherein the operations further comprise granting the license to the host after completing the authentication protocol, the license enabling the host to access content contained on the store.

18. The machine-readable storage medium of claim 10, wherein the machine-readable storage medium is included in a portable memory device.

19. The machine-readable storage medium of claim 18, wherein the portable memory device includes a flash memory, a Secure Digital (SD) card, or a Subscriber Identity Module (SIM) card.

20. A mobile media player device into which the portable memory device of claim 18 is inserted.

* * * * *